Oct. 10, 1939.  H. G. DAVIS  2,175,830
VARIABLE SPEED TRANSMISSION
Filed Oct. 27, 1937
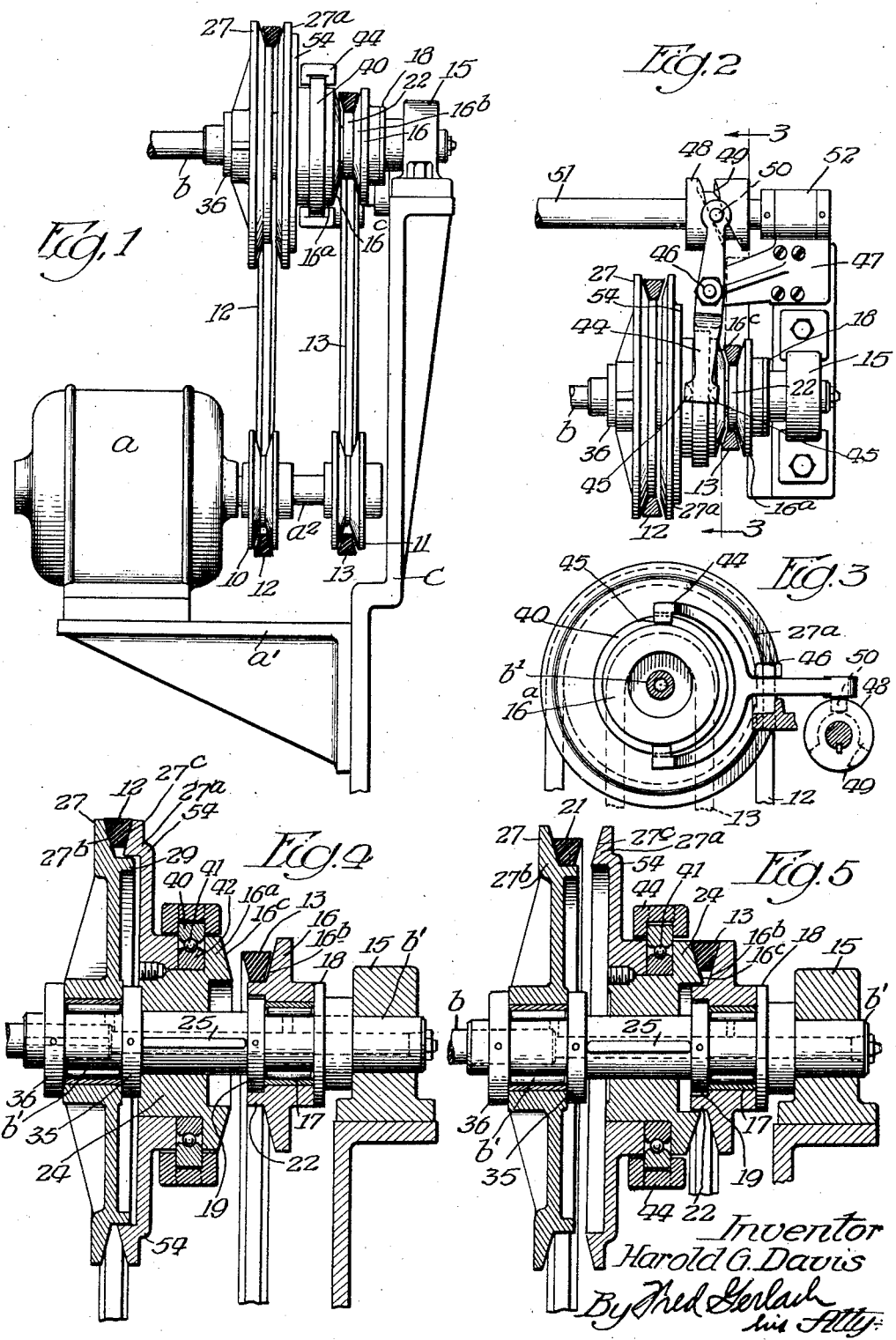

Patented Oct. 10, 1939

2,175,830

UNITED STATES PATENT OFFICE 2,175,830

VARIABLE SPEED TRANSMISSION

Harold G. Davis, Chicago, Ill., assignor to Foote Gear Works, Inc., Chicago, Ill., a corporation of Illinois Application October 27, 1937, Serial No. 171,267

3 Claims. (Cl. 74—217)

The invention relates to variable speed drives of the V-belt type.

The object of the invention is to provide simple and efficient variable speed driving mechanism in which a plurality of V-belts are used.

Other objects of the invention will appear from the detail description.

The invention consists in the several novel features which are hereinafter set forth and are more particularly defined by claims at the conclusion hereof.

In the drawing: Fig. 1 is a side elevation of driving mechanism embodying the invention, the belts being shown in section. Fig. 2 is a plan, the belts being shown in section. Fig. 3 is a section on line 3—3 of Fig. 2. Fig. 4 is a vertical section of the pulleys on the counter-shaft, with a low-speed pulley and its drive-belt illustrated in position for low-speed transmission of power. Fig. 5 is a similar section illustrating the mechanism in position for high-speed transmission.

The invention is exemplified in variable speed driving mechanism between an electric motor $a$ and a countershaft $b$ to be driven from the motor for driving any desired machine or mechanism at two different speeds. The motor is supported on a bracket $a'$ which is secured to a suitable support $c$. The armature shaft $a^2$ of the motor has secured thereto a plurality of pulleys 10 and 11, which may be of the same or different diameters and have V-shaped grooves in their peripheries for respectively driving V-belts 12 and 13.

The mechanism to be driven by the V-belts and for driving shaft $b$ comprises a hollow shaft section $b'$, one end of which is secured to the counter-shaft $b$. Shaft section $b'$ is journaled in a bearing 15 carried by the support $c$ and may, if desired, be otherwise additionally supported.

Belts 12, 13 are adapted to drive a pair of sectional pulleys of different diameters on the counter-shaft for driving the shaft $b$ at two different speeds from the motor $a$. Each pulley is composed of a pair of sections having conoidal side-faces for gripping the sides of the belts, one of the sections of each pulley being slidable toward or from the other to grip or release the driving belt and control the driving of the counter-shaft and the speed at which it will be driven. Both of the slidable sections are also movable into a neutral position in which neither of the belts is operative to drive the counter-shaft.

The pulley which is driven by belt 13 comprises a section 16 which is held against axial movement on shaft-section $b'$ and a complementary axially movable section 16a between which the belt 13 is confined. The pulley which is driven by belt 12 comprises a section 27 held against axial movement on shaft section $b'$ and an axially movable section 27a between which the belt 12 is confined. The pulley sections 16, 27 which are held against axial movement are supported to rotate around shaft-section $b'$ and axially movable pulley sections 16a and 27a are slidable on shaft section $b'$ and splined thereto to drive the shaft sections from either pulley.

Pulley-section 16 is carried by a roller-bearing 17 around shaft-section $b'$, is rotatable independently of shaft $b$, and is confined against endwise movement by a washer 18 which is held by bearing 15 and a collar 19 which is fixedly secured to shaft-section $b'$. Pulley-section 16 is provided with an inclined or conoidal side-face 16b which is adapted to be engaged by one of the inclined sides of the V-belt 13 and with an inwardly extending cylindrical hub-portion 22 approximately in the line of the inner face of the V-belt. This hub-portion 22 may be engaged by the inner face of belt 13 when the latter is loose. The complementary section 16a has an inclined side-face 16c and an integral hub 24 which is slidably mounted on shaft-section $b'$. Splines 25 are formed on shaft-section $b'$ and interfit with grooves in hub 24 to drive the shaft $b$ through said hub and shaft-section $b'$. Pulley-section 16a is slidable towards pulley-section 16 to cause the inclined side-face of belt 13 to be gripped between the inclined faces 16b, 16c of pulley-sections 16, 16a, as illustrated in Fig. 5. When belt 13 operatively engages the pulley-sections 16, 16c, the shaft will be driven at high speed through hub 24, splines 25 and shaft-section $b$.

The pulley-section 27 is adapted to be driven by the V-belt 12 and is provided with an inclined side-face 27b for engagement by one side of said belt. A cylindrical portion 29 on section 27 projects axially from the inclined side-face toward pulley-section 27a for guiding the inner face of the belt when it is loose. Pulley-section 27a is fixed by a screw 31 to the slidable hub 24 and is provided with an inclined side-face 27c for engagement with the contiguous inclined side-face of V-belt 12. The hub of pulley-section 27 is journaled on a roller-bearing 34 around shaft-section $b'$ and is held against axial movement thereon by collars 35, 36 which are suitably secured to shaid shaft-section. Hub 24 carries both of the pulley-sections 16a and 27a so that they are conjointly slidable on and rotatable with shaft-section $b'$. By thus mounting both of the inner pulley-sections, they are conjointly shiftable to alternately render either of the pulleys operative or both inoperative.

The pulley-sections 27ᵃ and 16ᵃ are shiftable into an intermediate position, as shown in Fig. 1, in which said sections will be separated from the inner side-faces of the V-belts 12 and 13. In this position, the belts will be loose on pulley-sections 16, 27, disengaged from pulley-sections 16ᵃ 27ᵃ, will be guided by the cylindrical portions 22, 29, and free to revolve around shaft-section b' at different speeds. When pulley section 27ᵃ is shifted outwardly toward pulley-section 27, the inclined side-faces 27ᵇ, 27ᶜ of said sections will grip the inclined side-faces of V-belt 12 and cause the low-speed pulley, hub 24, and pulley-section 16ᵃ to be driven by said belt. This will drive shaft b at low speed, as illustrated in Fig. 4.

When pulley-section 16ᵃ is shifted towards pulley-section 16 to grip belt 13 between inclined side-faces 16ᵇ, 16ᶜ, the belt will be operatively connected to drive said pulley-sections and drive, through hub 24 and shaft-section b', the shaft b at low speed. When belt 12 is gripped between pulley-sections 27, 27ᵃ, belt 13 will be loosely guided by the cylindrical portion 22 of section 16ᵃ, which may rotate idly. When belt 13 is gripped between pulley-sections 16, 16ᵃ, belt 12 will be loosely guided by portion 29 of section 27 which may then rotate idly. Each of the axially movable pulley-sections is recessed, as at 54, to receive the cylindrical portion of its complementary section when the sections are brought together to grip the belts.

The mechanism for shifting sleeve 24 to control the operation of the driving mechanism comprises a collar 40 journaled on a ball-bearing 41 which comprises an inner race 42 which is fitted in a groove in hub 24 formed between the hub of pulley-section 27ᵃ and a flange on pulley-section 16ᵃ, and a forked lever 44 which has lugs 45 for engaging and shifting the collar 40 and is fulcrumed at 46 in a supporting bracket 47. Lever 44 is pivotally movable by a collar 48 which is provided with a cam-groove 49 adapted to engage and shift a pin 50 on the outer end of lever 44. Collar 48 is fixed to a shaft 51 which is journaled in a bearing 52 and is adapted to be rotated by any suitable means to shift lever 44 for setting it to hold the slidable pulley-sections at neutral or for driving at high or low speeds.

The operation will be as follows: To render the driving mechanism idle or inoperative, the operator will rotate shaft 51 to shift lever 44 through cam 49 to separate the pulley-sections 16ᵃ and 27ᵃ, respectively, from pulley-sections 16 and 27, as illustrated in Fig. 1. At such time the belts 13, 12 will be disengaged from pulley-sections 16ᵃ and 27ᵃ, respectively, and the belts will be loosely held on hub-portions 22, 29 of the pulley-sections, respectively. When shaft b is to be driven at high speed, the operator will rotate shaft 51 to shift lever 44 to bring pulley-sections 16ᵃ, 27ᵃ into position shown in Fig. 5. Belt 13 will then be gripped between pulley-sections 16, 16ᵃ and will drive hub 24, shaft-section b' and shaft b at high speed. At such time, belt 12 will be supported from pulley-section 27ᵃ and will be guided by and may idly rotate pulley-section 27. When shaft b is to be driven at low speed, the operator will rotate shaft 51 to shift lever 44 to bring the slidable pulley-sections into position shown in Fig. 4. At such time, belt 12 will be gripped between pulley-sections 27, 27ᵃ, so the hub 24 will be driven to drive shaft b. At such time belt 13 will be guided by the hub-portion 22 of pulley-section 16 and said section may rotate idly with said belt.

The invention exemplifies variable speed driving mechanism in which V-belts are gripped between axially movable pulley-sections, which is simple in construction and which can be readily controlled to control the V-belts for operation of a shaft at different speeds.

The invention is not to be understood as restricted to the details set forth, since these may be modified within the scope of the appended claims, without departing from the spirit and scope of the invention.

Having thus described the invention, what I claim as new and desire to secure by Letters Patent is:

1. Variable speed driving mechanism, comprising a plurality of V-belts, a plurality of drive-pulleys having grooves therein, fitting the belts, respectively, a shaft to be driven, a pair of pulleys to be driven by the belts, respectively, each comprising a pair of complementary sections having inclined side-faces for gripping the belts, one section of each pair being axially movable on the shaft to engage an inclined side of one of the belts and rotatable with the shaft to drive it, the other section being held against axial movement and rotatable on the shaft, the axially movable sections being fixed to rotate and slide together between the rotatable sections, and means for shifting the axially movable sections to grip either of the belts, respectively.

2. Variable speed driving mechanism, comprising a plurality of V-belts, a plurality of drive-pulleys having grooves therein, fitting the belts, respectively, a shaft to be driven, a pair of pulleys to be driven by the belts, respectively, each comprising a pair of complementary sections having inclined side-faces for gripping the belts and a cylindrical portion for guiding the inner faces of one of the belts, one section of each pair being axially movable on the shaft to engage an inclined side of one of the belts and rotatable with the shaft to drive it, the other section being held against axial movement and rotatable on the shaft, the axially movable sections being fixedly secured together for rotary and longitudinal movement and recessed to receive the cylindrical portions, respectively, and means for shifting the axially movable sections to grip either of the belts, respectively.

3. Variable speed driving mechanism, comprising a plurality of V-belts, a plurality of drive-pulleys having grooves therein, fitting the belts, respectively, a shaft to be driven, a pair of pulleys to be driven by the belts, respectively, each comprising a pair of complementary sections having inclined side-faces for gripping the belts, one section of each pair being axially movable on the shaft to engage an inclined side of one of the belts and rotatable with the shaft to drive it, the other section being held against axial movement and rotatable on the shaft, the axially movable members being fixedly secured together for rotary and longitudinal movement and having hubs, one of which is mounted on and fixedly secured to the other, and means for shifting the axially movable sections to grip the belts, respectively, comprising a collar between the hubs.

HAROLD G. DAVIS.